(12) United States Patent
Tincombe

(10) Patent No.: US 10,212,955 B1
(45) Date of Patent: *Feb. 26, 2019

(54) FORMULA FOR A FOOD DECORATING PAINT FOR APPLICATION ON THE SURFACE OF FOOD OBJECTS

(71) Applicant: Michelle D. Tincombe, Phoenix, AZ (US)

(72) Inventor: Michelle D. Tincombe, Phoenix, AZ (US)

(*) Notice: Subject to any disclaimer, the term of this patent is extended or adjusted under 35 U.S.C. 154(b) by 557 days.

This patent is subject to a terminal disclaimer.

(21) Appl. No.: 14/695,234

(22) Filed: Apr. 24, 2015

Related U.S. Application Data

(60) Provisional application No. 61/983,575, filed on Apr. 24, 2014.

(51) Int. Cl.
*A23G 3/34* (2006.01)
*A23L 1/275* (2006.01)
*A23L 5/42* (2016.01)

(52) U.S. Cl.
CPC ............. *A23L 1/275* (2013.01); *A23G 3/343* (2013.01); *A23L 5/42* (2016.08); *A23V 2002/00* (2013.01)

(58) Field of Classification Search
CPC ........ A23D 7/001; A23D 7/003; A23D 7/013; A23G 1/305; A23G 3/343; A23G 3/346; A23G 3/36; A23G 3/362
See application file for complete search history.

(56) References Cited

U.S. PATENT DOCUMENTS

| 5,102,680 A | 4/1992 | Glass et al. | |
|---|---|---|---|
| 6,203,841 B1 | 3/2001 | Lynch et al. | |
| 6,565,909 B1 * | 5/2003 | Huang | A23G 3/0006 426/572 |
| 2005/0025872 A1 * | 2/2005 | Joseph | A23D 7/0053 426/601 |
| 2006/0013928 A1 * | 1/2006 | Steet | A23G 1/30 426/302 |
| 2011/0280942 A1 * | 11/2011 | Schad | A61K 9/2813 424/476 |

FOREIGN PATENT DOCUMENTS

| WO | WO2013061061 | 5/2013 | |
|---|---|---|---|
| WO | WO-2014152952 A1 * | 9/2014 | ............... A23G 4/20 |

* cited by examiner

*Primary Examiner* — Walter A Moore
(74) *Attorney, Agent, or Firm* — Mark V. Loen

(57) ABSTRACT

The embodied invention is a mixture that is used for direct application on a food surface for the purpose of decoration. The mixture is a complete 'ready to apply', desirable tasting paint mixture which saves the consumer time, effort, and messiness, and also allows the consumer to apply colors on top of each other without color bleed. The formulation includes FDA approved food colors, emulsifiers, preservatives, and a pH additive. It also allows the decorator ease in combining colors to custom specifications. The ease of application is designed for all settings of food decoration, both for professional and household use. The formulation is also unique by using a white pigment suspension to provide a full spectrum of ready to use, vibrant colors.

4 Claims, No Drawings

US 10,212,955 B1

FORMULA FOR A FOOD DECORATING PAINT FOR APPLICATION ON THE SURFACE OF FOOD OBJECTS

CROSS REFERENCE TO RELATED APPLICATIONS

This application claims the benefit of provisional application No. 61/983,575 filed on Apr. 24, 2014. The entire provisional application is incorporated by reference herein.

STATEMENT REGARDING FEDERALLY SPONSORED RESEARCH OR DEVELOPMENT

Not applicable.

REFERENCE TO SEQUENCE LISTING, A TABLE, OR COMPUTER PROGRAM LISTING

Not applicable.

BACKGROUND OF THE INVENTION

(1) Field of the Invention

This invention is directed toward convenient food decorating mixtures, specifically mixtures which are directly applied to the surface of a food object, such as cookies, cakes, confections, pastries, chocolates, and other food items without the need to mix into another medium.

(2) Description of Related Art

There are food 'colorants' currently on the market, specifically for food, which are used as an ingredient by the consumer for the purpose of changing the color of a base product, such as frosting, a fondant, cookie dough, or cake batter. For example, current food coloring mixtures are added as an ingredient to a white frosting or kneaded into fondant to permanently change the color. Fondants are very stiff and the effort to knead a color into it is very time consuming. The use of colorants other than the intended use to change a base product color, such as the use as a decorative surface paint mixture has difficulties. The creation of precise and visibly pleasing colors is difficult as the colors bleed extensively into each other when applying currently available mixtures on top of each other. Therefore the consumer is unable to apply specific colors or designs properly. For example if the consumer wanted to paint a pink heart with a yellow design over the top of it, the two colors bleed into each other due to the thin viscosity of the colorants, changing both colors into an undesirable and muddled effect. Furthermore, since food colorants are not created specifically to be applied on the surface as a decorative food paint, they are highly concentrated with food dye products. Highly concentrated food dye products have a very unpleasant, bitter taste which is not practical for direct food surface application, especially for the decoration of food products such as cookies, cakes, cupcakes, pastries, desserts, etc.

Others have worked on edible food coloring mixtures. WO 2013061061 describes the specific use of 'metallic pearlescent pigments.' The product formulation comprises of pearlescent pigments which creates metallic hues in the paints. Metallic pigments, such as the pearlescent pigments, are not a suitable color to apply to large areas of surface decoration, as it limits the decorator or artist to only metallic mediums. More importantly, metallic pigments are generally applied in the field of food decorating only for small area embellishment or sparkle accent due to their bitter taste. Metallic pigments are also thin which does not allow the artist to create a decoration using a textured 'impasto' effect to the surface of food such as cookies, cakes, and confections. It is important to provide a desirable taste and to avoid bitter tasting metallic pigments.

The current method of decorating requires the decorator to use a food colorant as an ingredient by mixing it into the icing, frosting, whipped cream, etc. and self determine when the decorating mixture is suitable to the decorating project that they are working on. Additionally, it must provide the desired taste (i.e. not be bitter) and be capable of providing the desired aesthetic effect. This is a difficult requirement as it requires the decorator to experiment with the base material and adjust the amount of coloring needed to achieve the multiple desired requirements. The desired colors must not bleed into each other, mix well (i.e. disperse), have appropriate taste, be non-toxic, have the proper consistency, and have the color that facilitates the desired artistic effect. It is difficult for the decorator to achieve the broad spectrum of colors needed in decorating. Experimentation by the decorator leads to waste and lack of optimizing the taste and desired decorative effects. An unskilled decorator lacks the skill, knowledge and time to provide a mixture suitable to meet all demands.

Others have worked in the field of coloring. For example U.S. Pat. No. 5,102,680 and U.S. Pat. No. 5,203,841 are examples of food colorants, which bleed into each other, and have a metallic taste. They must be mixed, as an ingredient, into another decorating medium, such as frosting, in order to achieve desired colors and consistencies. Also, such colorants described in the references lack the ability to provide a complete decorating mixture that will provide for convenient and desirable application without the need for the decorator to mix into a decorating medium.

What is needed in the market is premade decorating mix that is neither bitter tasting (due to the dyes/colorants used), and allows for extensive decorating without color bleed. For example, the mixture must allow the decorator to paint multiple overlays of colors to achieve the desired aesthetic effects without one color melting or bleeding extensively into another color, be capable of a full spectrum of colors without the inconvenience of having to experiment by mixing food colorants into a base to achieve the desired colors which are currently not available in the colorants currently on the market, and have a viscosity which allows the artist to apply the paints using various application techniques, such as paint brushes, sponging, rolling, stamping, pallet knife texturing etc.

BRIEF SUMMARY OF THE INVENTION

The embodied invention is a mixture that is used for direct application on a food surface for the purpose of decoration, much like an artist applies paint to a canvas in various techniques and textures. It is not an ingredient, a food 'colorant', or metallic embellishment. The mixture is a complete 'ready to apply', desirable tasting paint mixture which allows the consumer/artist to overlap colors without color bleed. This formula also saves the decorator time by providing an easy method of painting colors on the surface of fondant instead of the effort and messiness of mixing different food colorants into multiple fondant pieces for a desired artistic effect. It can be applied in various techniques such as brushes, sponges, and rollers in a paint like viscosity, or applied using an impasto technique utilizing pallet knives. The formulation includes a base formula, FDA approved food dyes, emulsifiers, and a pH additive. It also allows the decorator ease in combining colors without color bleed to desired specifications. It also allows the artist convenience in decorating with ready to use vibrant colors. The ease of application is designed for all settings of food decoration, both for professional and household use. The formulation is also unique by using a white pigment suspension to provide a full spectrum of ready to use, vibrant colors. A decorator also has the option of easily combining colors to their own custom specifications.

BRIEF DESCRIPTION OF THE SEVERAL VIEWS OF THE DRAWING(S)

Not applicable.

DETAILED DESCRIPTION OF THE INVENTION

The recipe for the invention is a combination of
1) Base application mixture
2) Colorant(s)
3) Emulsifier(s)
4) Optional Preservative(s), and
5) pH additive(s).

The base mixture is a combination of water (or vegetable oil), sugar, salt (NaCl), vegetable gum, pH additive, white colorant, vanilla (or other) flavoring, and modified food starch. If water is not used, and a vegetable oil is used instead, two different mixtures result—a water based paint or an oil based paint.

The colorant mixture is comprised of food grade or combinations of FDA approved FD&C colorants, dye mixes, mixtures of food colorants including additives exempt from FDA certification, and additives requiring FDA certification. In particular, it has been found that adding a colorant of $TiO_2$ and/or calcium carbonate provides a basis to achieve a broad spectrum of vibrant colors. The mixture is designed to allow the $TiO_2$ to disperse well.

Dyes and lakes are both used in food coloring. Generally, dyes dissolve in water but not oil. They are used in all kinds of food, such as liquid, mixes, and finished products. Dyes can cause problems with ingestion if the amount is too high. Lakes are made from dyes which are chemically combined with a salt. Lakes tint by dispersion and are more stable than dyes.

A list of color additives exempt from certification by the FDA and permanently listed for FOOD use follows. The numbers in brackets ( ) indicate a regulation number under 21CFR.
 A. Algae meal, dried—Chicken feed only: ≤0.3% ethoxyquin in meal≤150 ppm ethoxyquin in final feed—(73.275)
 B. Annatto extract—GMP—(73.30)
 C. Astaxanthin—Salmonid fish feed only: ≤80 mg per kg of finished feed—(73.35)
 D. Astaxanthin dimethyldisuccinate—Salmonid fish feed only: ≤80 mg per kg of finished feed—(73.37)
 E. Beet juice (as vegetable juice)—GMP—(73.260)
 F. Beet powder (Dehydrated beets)—GMP—(73.40)
 G. Beta-Apo-8′-carotenal—General use: ≤15 mg/lb of solid or semisolid food or per pint of liquid food—(73.90)
 H. Beta carotene, natural and synthetic—GMP—(73.95)
 I. Canthaxanthin—General use: ≤30 mg/lb of solid or semisolid food or per pint of liquid food; broiler chicken feed: ≤4.41 mg per kg (4 gm/ton) of complete feed; salmonid fish feed: ≤80 mg per kg (72 gm/ton) of finished feed—(73.75)
 J. Caramel—GMP—(73.85)
 K. Carmine—GMP—(73.100)
 L. Carrot oil—GMP—(73.300)
 M. Cochineal extract—GMP—(73.100)
 N. Corn endosperm oil—Chicken feed only—(73.315)
 O. Cottonseed flour, toasted partially defatted cooked—GMP—(73.140)
 P. Ferrous gluconate —Ripe olives only—GMP—(73.160)
 Q. Ferrous lactate—Ripe olives only—GMP—(73.165)
 R. Fruit juice—GMP—(73.250)
 S. Grape color extract—Nonbeverage food only—(73.169)
 T. Grape skin extract (enocianina)—Still and carbonated drinks and ades, beverage bases and alcoholic beverages (in accordance with Parts 4 & 5 of 27 CFR)—(73.170)
 U. Haematococcus algae meal—Salmonid fish feed only. Total astaxanthin from all astaxanthin color additive sources listed in part 73, ≤80 mg per kg of finished feed—(73.185)
 V. Synthetic iron oxide—Sausage casings for humans: ≤0.10% by wt. of finished food; cat & dog food: ≤0.25% by wt of finished food—(73.200)
 W. Lycopene, tomato extract or concentrate—GMP—(73.585)
 X. Mica-based pearlescent pigment—1.25% by weight in cereals, confections and frostings, gelatin desserts, hard and soft candies (including lozenges), nutritional supplement tablets and gelatin capsules, and chewing gum.—(73.350)
 Y. Paprika & Paprika oleoresin—GMP—(73.340 & 73.345)
 Z. *Paracoccus* pigment—Salmonid fish feed only: ≤80 mg per kg of finished feed—(73.352)
 AA. Phaffla yeast—Salmonid fish feed only. Total astaxanthin from all astaxanthin color additive sources listed in part 73, ≤80 mg per kg of finished feed—(73.355)
 BB. Riboflavin—GMP—(73.450)
 CC. Saffron—GMP—(73.500)
 DD. Sodium copper chlorophyllin—Citrus-based dry beverage mixes only: ≤0.2 percent by wt. of the dry mix—(73.125)
 EE. *Tagetes* (Aztec marigold) meal and extract—Chicken feed only: ethoxyquin content≤0.3% by wt. of additive and ≤150 ppm by wt. of final feed—(73.295)
 FF. Titanium dioxide—≤1.0% by wt. of food—(73.575)
 GG. Turmeric & Turmeric oleoresin—GMP—(73.600 & 73.615)
 HH. Ultramarine blue—Salt for animal feed only: ≤0.5% by wt. of salt—(73.50
 II. Vegetable juice—GMP—(73.260)
FD&C Colorants used in Food
 A. FD&C Blue #1—Food, drugs and cosmetics, including drugs and cosmetics for eye area—GMP—(74.101, 74.1101, 74.2101, 82.101)
 B. FD&C Blue #2—Food and ingested drugs—GMP—(74.102, 74.1102); sutures—see medical devices—(74.3102.)
 C. FD&C Green #3—Food, drugs and cosmetics—GMP—(74.203, 74.1203, 74.2203, 82.203)

D. FD&C Red #3—Food and ingested drugs—GMP—(74.303, 74.1303). May no longer be used in cosmetics, external drugs, and lakes E. FD&C Red #40 and its Aluminum Lake—Food, drugs and cosmetics, including drugs and cosmetics for eye area—GMP. Other lakes for food, drugs and cosmetics are also permanently listed—(74.340, 74.1340, 74.2340)

F. FD&C Yellow #5—Food, drugs and cosmetics, including drugs and cosmetics for eye area—GMP—(74.705, 74.1705, 74.2705, 82.705)

G. FD&C Yellow #6—Food, drugs and cosmetics—GMP—(74.706, 74.1706, 74.2706, 82.706)

In one embodiment the emulsifier is a vegetable gum such as Cellulose Gum, Gum Arabic, Guar Gum, Xanthan Gum. Additionally, it could Lecithin.

In another embodiment, the FDA approved preservative is Potassium Sorbate. In another embodiment, it is a combination of other known antimicrobial preservatives that include sorbic acid and its salts, benzoic acid and its salts, calcium propionate, sodium nitrite, sulfur dioxide, sodium bisulfite, potassium hydrogen sulfite, and disodium EDTA.

In another embodiment, the pH additive is preferably a Citric Acid, but other pH additives could be used that include: Sodium Sulfate, Ascorbic Acid, Lactic Acid, Malic Acid, Sodium Ascorbate, and Tartaric Acid.

In another important embodiment, a white base color (such as $TiO_2$ and/or calcium carbonate) is added to the base to achieve a full spectrum of vibrant colors. The white base is what allows any added color to visually 'pop' or reflect different hues. $TiO_2$ is one compound that works well in a white base color.

For a water based paint, the mixture amounts are preferably combined together in a dry premix, added to the water, and then the entire mixture is raised to a boiling temperature. Similarly, for oil based paint, the mixture amounts are preferably combined together in a dry premix, added to the vegetable oil, and then the entire mixture is raised to a boiling temperature. This sanitizes the mixture for use as an edible surface paint, and also aids in dissolving the constituent dry mix components evenly. The wet mixture is optionally stirred to facilitate dissolving the dry mix components and dispersing them evenly. When packing the mixture into containers for sales, they are preferably hot packed.

In one preferred embodiment, the mixture is combination per table 1 below (gr=gram, oz=ounces). The min/max percentages are based on weight. Vegetable oil (or cooking oil) is any one of coconut oil, seed oil, nut oil, palm kernel oil, safflower oil, sunflower oil, corn oil, canola oil, soy oil, citrus oil, hemp oil, soybean oil, sesame oil, olive oil, cottonseed oil, and rapeseed oil. A vegetable oil specific gravity of 0.915 is used to calculate weight percentages.

TABLE 1

Recipe Amounts and Weight Percentages

| Item (Amount units) | Water Based Paint | | | Oil Based Paint | | |
|---|---|---|---|---|---|---|
| | Amount | Min % | Max % | Amount | Min % | Max % |
| Water (Base) oz | 7-12 | 14 | 32 | 0 | 0 | 0 |
| Vegetable oil (Base) oz | 0 | 0 | 0 | 6-28 | 12 | 50 |
| Sugar-Granulated (Base) gr | 240-350 | 17 | 34 | 240-350 | 13 | 36 |
| Flavoring such as Vanilla (Base) gr | 1-20 | 0.1 | 2.1 | 1-20 | 0.1 | 2.2 |
| Corn Starch-Modified (Base) gr | 8-15 | 0.5 | 1.6 | 8-15 | 0.4 | 1.7 |
| Salt (Base) gr | 3-12 | 0.2 | 1.3 | 3-12 | 0.2 | 1.4 |
| Calcium Carbonate (Colorant) gr | 460-520 | 32 | 53 | 460-520 | 25 | 56 |
| Titanium Dioxide $TiO_2$ (Colorant) gr | 5-225 | 0.4 | 20 | 5-225 | 0.3 | 21 |
| FD&C Food Dye (Colorant) gr | 0-30 | 0 | 3.2 | 0-30 | 0 | 3.3 |
| Cellulose Gum (Emulsifier) gr | 0.25-1 | 0.02 | 0.1 | 0.25-1 | 0.01 | 0.1 |
| Citric Acid (pH Control) gr | 0.25-2 | 0.02 | 0.2 | 0.25-2 | 0.01 | 0.2 |
| Potassium Sorbate (Preservative) gr | 0-2 | 0 | 0.2 | 0-2 | 0 | 0.2 |

The mixture amounts may be scaled to different batch sizes by keeping the relative ratios of the ingredients the same. The weights are converted to percentages as shown in table 1, so as to facilitate mixing to the desired amount in different batch sizes. The ingredient amounts and weight percentages should be understood as rounded to the lowest significant digit.

The oil based paint recipe can be varied to have a thick consistency up to a paste like consistency. This allows textures and patterns to be imparted to the surface of food. This is very desirable for artistic reasons.

$TiO_2$ is currently allowable at a 1% in a finished recipe per FDA (i.e. approximately 9 grams). If future regulations allow for a higher level of $TiO_2$, then the recipe coloring is improved by an increase in the amount.

The overall goal of the mixture is to provide a 'ready-made' decorative, and apply-able, food paint mixture. The described mixture will provide a vibrant color, lack of bleeding between different color mixtures, along with desirable taste.

In one embodiment the oil based paint mixture is modified to provide a stiffer paste like medium for decorating and painting, by eliminating the water and replacing it with oil, and the other ingredients remain the same.

Decorative items that are targeted in the conceived invention include food items such as cookies, cakes, confections, chocolates, and pastries. The flavoring type can be modified to match the item being decorated. Vanilla flavoring is one embodiment of the invention.

The decorating mixture may be applied with tools such as a brushes, a rigid applicator, pallet knives, a sprayer, various stamps, sponges, roller type decorating and embossing, a squeeze tube, and other methods such as may be needed to create a desired aesthetic effect.

While various embodiments of the present invention have been described, the invention may be modified and adapted to various operational methods by those skilled in the art. Therefore, this invention is not limited to the description and figure shown herein, and includes all such embodiments, changes, and modifications that are encompassed by the scope of the claims.

I claim:

1. A ready to directly apply to food surfaces decorative mixture comprising:
   A) a base application mixture comprising:
      1) a white colorant,
      2) water,
      3) sugar,
      4) sodium chloride,
      5) modified food starch, and
      6) flavoring,
   B) a colorant,
   C) an emulsifier comprising a vegetable gum,
   D) a pH additive comprising citric acid, and
   E) wherein said base application mixture, said colorant, said emulsifier, and said pH additive are premixed together and then added to said water and heated to a boiling temperature,
   F) wherein said white colorant in said decorative mixture comprises:
      1) calcium carbonate in an amount from about 32% to about 53% by weight of the decorative mixture, and
      2) titanium dioxide in an amount from about 0.4% to about 20% by weight of the decorative mixture, wherein said decorative mixture is ready to directly apply to said food surfaces.

2. The decorative mixture for food surfaces according to claim 1 wherein said decorative mixture includes a preservative comprising potassium sorbate.

3. An edible, ready to directly apply to a food surface, decorative water based paint mixture comprising:
   A) from about 14% by weight to about 32% by weight water,
   B) from about 17% by weight to about 34% by weight sugar,
   C) from about 0.1% by weight to about 2.1% by weight flavoring,
   D) from about 0.5% by weight to about 1.6% by weight modified corn starch,
   E) from about 0.2% by weight to about 1.3% by weight salt,
   F) from about 32% by weight to about 53% by weight calcium carbonate,
   G) from about 0.4% by weight to about 20% by weight titanium dioxide,
   H) from about 0% by weight to about 3.2% by weight FD&C food dye,
   I) from about 0.02% by weight to about 0.1% by weight cellulose gum,
   J) from about 0.02% by weight to about 0.2% by weight, citric acid, and
   K) from about 0% by weight to about 0.2% by weight potassium sorbate.

4. The decorative mixture for food surfaces according to claim 3 wherein claim items 3B through 3K are premixed together and then combined with said water and heated to a boiling temperature.

\* \* \* \* \*